United States Patent
Tzirkel-Hancock et al.

(10) Patent No.: US 9,171,551 B2
(45) Date of Patent: Oct. 27, 2015

(54) UNIFIED MICROPHONE PRE-PROCESSING SYSTEM AND METHOD

(75) Inventors: Eli Tzirkel-Hancock, Ra'Anana (IL); Omer Tsimhoni, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 949 days.

(21) Appl. No.: 13/334,920

(22) Filed: Dec. 22, 2011

(65) Prior Publication Data

US 2012/0185247 A1 Jul. 19, 2012

Related U.S. Application Data

(60) Provisional application No. 61/432,918, filed on Jan. 14, 2011.

(51) Int. Cl.
*G10L 21/0208* (2013.01)
*H04R 3/00* (2006.01)
*H04M 9/08* (2006.01)
*G10L 15/22* (2006.01)
*G10L 15/20* (2006.01)
(Continued)

(52) U.S. Cl.
CPC ............ *G10L 21/0208* (2013.01); *H04R 3/005* (2013.01); *G10L 15/20* (2013.01); *G10L 15/22* (2013.01); *G10L 2021/02166* (2013.01); *H04M 9/08* (2013.01); *H04R 1/406* (2013.01); *H04R 2499/13* (2013.01)

(58) Field of Classification Search
CPC ........ H04R 3/005; G10L 15/22; G10L 21/02; H04M 9/08
See application file for complete search history.

(56) References Cited

U.S. PATENT DOCUMENTS 4,461,024 A * 7/1984 Rengger et al. ................ 704/233
4,876,722 A * 10/1989 Dekker et al. ................ 381/71.5
(Continued)

FOREIGN PATENT DOCUMENTS

CN 1819477 A 8/2006

OTHER PUBLICATIONS

CN Office Action application No. 201210051572.3 Dated Feb. 11, 2014.
(Continued)

*Primary Examiner* — Eric Yen
(74) *Attorney, Agent, or Firm* — Mark S. Cohen; Pearl Cohen Zedek Latzer Baratz LLP

(57) ABSTRACT

A unified microphone pre-processing system includes a plurality of microphones arranged within a vehicle passenger compartment, a processing circuit or system configured to receive signals from one or more of the plurality of microphones, and the processing circuit configured to enhance the received signals for use by at least two of a telephony processing application, an automatic speech recognition processing application, and a noise cancellation processing application. The method includes receiving signals from one or more of a plurality of microphones arranged within a vehicle passenger compartment, and enhancing the received signals for use by at least two of a telephony processing application, an automatic speech recognition processing application, and a noise cancellation processing application. A computer readable medium containing executable instructions to cause a processor to perform a method in accordance with an embodiment of the invention is also described.

17 Claims, 4 Drawing Sheets

(51) Int. Cl.
*G10L 21/0216* (2013.01)
*H04R 1/40* (2006.01)

(56) References Cited

U.S. PATENT DOCUMENTS

| | | | | |
|---|---|---|---|---|
| 4,920,568 | A * | 4/1990 | Kamiya et al. | 704/233 |
| 5,832,095 | A * | 11/1998 | Daniels | 381/71.5 |
| 6,233,559 | B1 * | 5/2001 | Balakrishnan | 704/275 |
| 6,674,865 | B1 * | 1/2004 | Venkatesh et al. | 381/107 |
| 6,748,086 | B1 * | 6/2004 | Venkatesh et al. | 381/71.4 |
| 6,760,449 | B1 * | 7/2004 | Matsuo | 381/92 |
| 6,850,882 | B1 * | 2/2005 | Rothenberg | 704/211 |
| 6,914,854 | B1 * | 7/2005 | Heberley et al. | 367/119 |
| 7,274,794 | B1 * | 9/2007 | Rasmussen | 381/92 |
| 7,403,611 | B1 * | 7/2008 | He et al. | 379/420.01 |
| 7,415,117 | B2 * | 8/2008 | Tashev et al. | 381/92 |
| 8,009,841 | B2 * | 8/2011 | Christoph | 381/92 |
| 2003/0055535 | A1 * | 3/2003 | Voeller et al. | 700/279 |
| 2003/0097257 | A1 * | 5/2003 | Amada et al. | 704/208 |
| 2003/0160862 | A1 * | 8/2003 | Charlier et al. | 348/14.08 |
| 2003/0204397 | A1 * | 10/2003 | Amiri et al. | 704/231 |
| 2004/0165735 | A1 * | 8/2004 | Opitz | 381/92 |
| 2004/0220811 | A1 * | 11/2004 | Vandivier | 704/275 |
| 2004/0263646 | A1 * | 12/2004 | Cutler | 348/239 |
| 2005/0060142 | A1 * | 3/2005 | Visser et al. | 704/201 |
| 2005/0179540 | A1 * | 8/2005 | Rubenstein | 340/539.18 |
| 2005/0195988 | A1 * | 9/2005 | Tashev et al. | 381/92 |
| 2005/0213778 | A1 * | 9/2005 | Buck et al. | 381/94.3 |
| 2005/0216271 | A1 * | 9/2005 | Konig | 704/275 |
| 2006/0020454 | A1 * | 1/2006 | Gerber | 704/233 |
| 2006/0074686 | A1 * | 4/2006 | Vignoli | 704/275 |
| 2006/0104458 | A1 * | 5/2006 | Kenoyer et al. | 381/92 |
| 2006/0145537 | A1 * | 7/2006 | Escott | 307/10.1 |
| 2007/0273585 | A1 * | 11/2007 | Sarroukh et al. | 342/379 |
| 2008/0147397 | A1 * | 6/2008 | Konig et al. | 704/246 |
| 2008/0249779 | A1 * | 10/2008 | Hennecke | 704/270 |
| 2009/0022330 | A1 * | 1/2009 | Haulick et al. | 381/57 |
| 2009/0323925 | A1 * | 12/2009 | Sweeney et al. | 379/406.05 |
| 2010/0131269 | A1 * | 5/2010 | Park et al. | 704/233 |
| 2010/0312547 | A1 * | 12/2010 | Van Os et al. | 704/9 |
| 2011/0082690 | A1 * | 4/2011 | Togami et al. | 704/201 |
| 2012/0064916 | A1 * | 3/2012 | Woodsum | 455/456.1 |

OTHER PUBLICATIONS

CN Office Action application No. 201210051572.3 Dated Sep. 3, 2014.

* cited by examiner

UNIFIED MICROPHONE PRE-PROCESSING SYSTEM AND METHOD

PRIOR APPLICATION DATA

The present application claims benefit of prior provisional application 61/432,918, filed Jan. 14, 2011, entitled "UNIFIED MICROPHONE PRE-PROCESSING SYSTEM", incorporated by reference herein in its entirety.

FIELD OF THE INVENTION

The present invention relates to sound processing; in particular in a vehicle.

BACKGROUND

Currently, for automotive applications, different microphones and processing components may be used for telephony, speech recognition, and active noise reduction. For example, a single cardioid microphone may be placed in the headliner above the driver to provide best reception for telephony; and omni-directional microphones may be placed on the rear-view mirror to provide best reception for automatic speech recognition (ASR). Additional microphones, typically one per passenger, may be placed above the driver and passenger head to enable active noise reduction to cancel the effect of, for example, engine noise.

The use of multiple microphones and processing components may be expensive, and may have be of compromised quality, as the number of microphones available for each purpose is limited by cost and design constraints.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
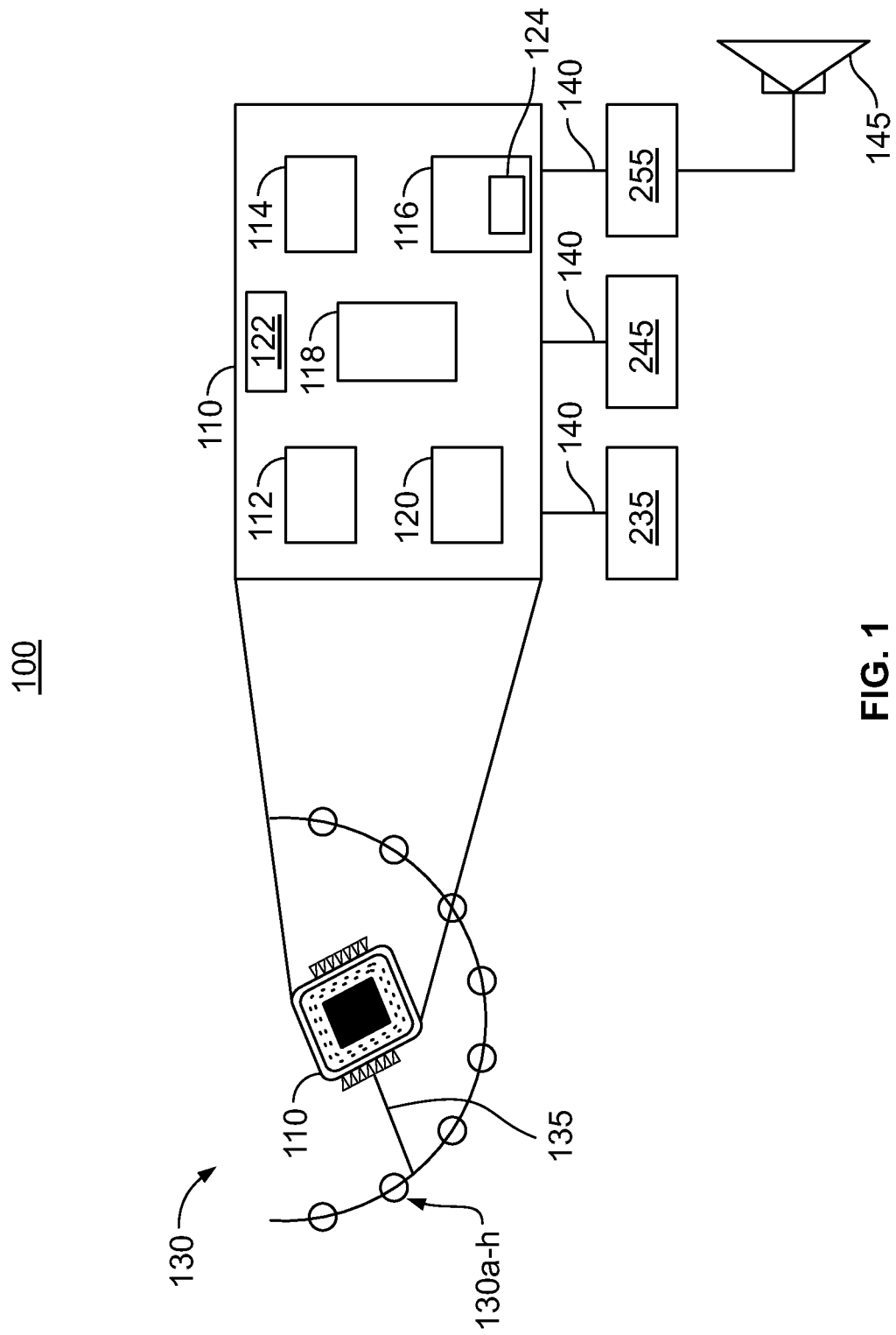
FIG. 1 illustrates a system in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, throughout the specification discussions utilizing terms such as "processing," "computing," "storing," "calculating," "determining," "evaluating," "measuring," "providing," "transferring," "outputting," "inputting," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A system in accordance with an embodiment of the invention may provide a unified microphone processing system to provide audio data to and enable telephony (e.g., cellular telephone devices), speech recognition, active noise control, and/or other functions. In one embodiment, the same or overlapping set of microphones, for example arranged in a geometrical pattern such as a partial sphere, hemisphere, or semisphere, may provide input concurrently, in parallel, at the same or substantially the same time or simultaneously to different audio processing functions (e.g., telephony, speech recognition, active noise control, etc.) in a vehicle. Alternatively, the overlapping set of microphones can provide input to different audio processing functions at different times, using the same microphones. Input signals of different kinds may be concurrently, in parallel, at the same or substantially the same time or simultaneously processed and created and provided to such applications, e.g., audio applications or audio-oriented applications.

FIG. 1 illustrates unified microphone processing (UMP) system 100 in accordance with an embodiment of the invention. UMP system 100 may output enhanced or processed signals to associated applications (e.g., audio applications or audio-oriented applications) such as a telephony processing application, an ASR processing application, and a noise cancellation processing application. Separate processed signals (e.g. three different signals) or other numbers processed signals having been formed using common or overlapping processing, or using common or overlapping sets of microphones, may be provided to applications. UMP system 100 may include an array 130 of microphones 130*a-h* arranged around or within the passenger compartment of a vehicle. In accordance with an embodiment of the invention, array 130 microphones 130*a-h* may be arranged in a hemispherical or semispherical unit 130 placed on the compartment's interior roof or headliner, for example between the driver and a passenger, or between the typical seating locations or seats intended for an occupant (e.g., a driver and zero or more passengers). While microphones 130*a-h* may be co-located in one unit, they may be separated by some distance to be spatially disparate. In one embodiment, eight microphones are used, but other numbers of microphones may be used. Other microphone positions, arrangement shapes or arrangements, and numbers of microphones, may be used. In one implementation, the semispherical unit may be about 10-15 cm in diameter. Microphones 130*a-h* may be connected to processing circuitry 110, e.g. via a link 135 such as a wire link, a network, or another system. Including multiple microphones serving multiple purposes in one unit may reduce wiring compared with systems having spread apart microphones each requiring its own wiring system. In other embodiments, microphones 130*a-h* may be distributed within the vehicle without being in the same unit.

Processing circuitry 110 may include signal amplifiers 122 to boost the signal level from the microphones. In accordance with an embodiment of the invention, microphones 130a-h may each include or be associated with an amplifier. In accordance with an embodiment of the invention, processing circuitry may be implemented in hardware (e.g., discrete analog circuitry, digital circuitry including field programmable gate arrays (FPGA), application specific integrated circuitry (ASIC), digital signal processor (DSP), and/or processing units), in software, or a combination of both hardware and software (e.g., code or instructions executed by a processor or controller such as central processor unit 118).

Processing circuitry 110 may include analog-to-digital (A/D) converter 112, flash memory unit 114, random access memory unit 116, control or central processor unit 118, and internal bus 120 which interconnects these components. Memory unit 116 may include table or database 124 storing for example data generated during calibration for noise cancellation or other functions. In operation, the actual location of a user or a user's ears may be determined. Input from camera 410, array 130, and/or A/D converter 112 may receive an analog signal from one or more of microphones 130a-h. The received analog signal may be converted to a digital signal for example suitable for processing or storage in RAM unit 116 or flash memory unit 114. Control processor unit 118 may access the stored digital signal(s) and perform acoustic pre-processing signal enhancement techniques to improve performance of, for example, telephony, active noise reduction or cancellation, ASR, and/or other applications. These enhanced signals may be made available on data bus 140 for access by these or other applications. A beamformer within processing circuitry 110 may receive signals from N microphones and output a single signal of enhanced quality. In this embodiment the output signals include, for example, a signal for telephony, a signal for ASR, and one or more signals for active noise cancellation; alternately, a unified beamforming signal may be provided to multiple units, and beamforming may not be done for all applications. Unified beamforming may not be applied in pre-processing for noise cancellation processing applications.

Loudspeaker(s) 145 may output sound such as noise cancellation sound, telephone or radio output, or other output (different or the same, or overlapping loudspeakers may be associated with each application).

In accordance with an embodiment of the invention, the digital signal(s) may be processed by control processor unit 118 as the signals received from microphones 130a-h are converted by A/D unit 112. Post-processing digital signals may be for example stored in RAM unit 116 and/or flash memory unit 114 and/or passed on to other units or applications.

Flash memory unit 114 or RAM 116 may store or contain software code which when executed by control processor unit 118 may cause the control processor to perform processes discussed herein, such as processing the stored or incoming digital signal(s), beamforming, noise cancellation, ASR, etc. In one implementation, flash memory 114 may include an external flash memory accessible by control processor 118 via an input/output port (not shown). Flash memory unit 114 or RAM 116 may store or contain intermediate signals or data, or data to other units, such as applications.

A compact arrangement of multiple microphones in accordance with an embodiment of the invention may enable spatial filtering by forming or shaping multiple reception beams directed at the occupants (e.g., driver and passengers), where each reception beam may use all microphones simultaneously. Beamforming, spatial filtering, or another signal processing technique may be used to achieve directional sound reception by for example combining microphone input in a way where signals at particular angles experience constructive interference and while others experience destructive interference. Other techniques, such as using noise signals from one microphone to cancel or clean noise from another microphone, may be used. Separate reception beam patterns may be formed for each purpose, e.g., telephony, ASR, active noise reduction or cancellation, etc. Each of these separate reception beam patterns may be configured to use all microphones so as to obtain the best received signals for each purpose to achieve optimum processing performance. In some embodiments, subsets of microphones may be used for certain applications.

Spatial filtering, beamforming and signal enhancement as used with embodiments of the present invention may be adaptive to, and may react to or be controlled by, changes in acoustic conditions in the passenger compartment, for example, the actual number of passengers, their exact locations within the passenger compartment, noise conditions, etc.

Figure 2:
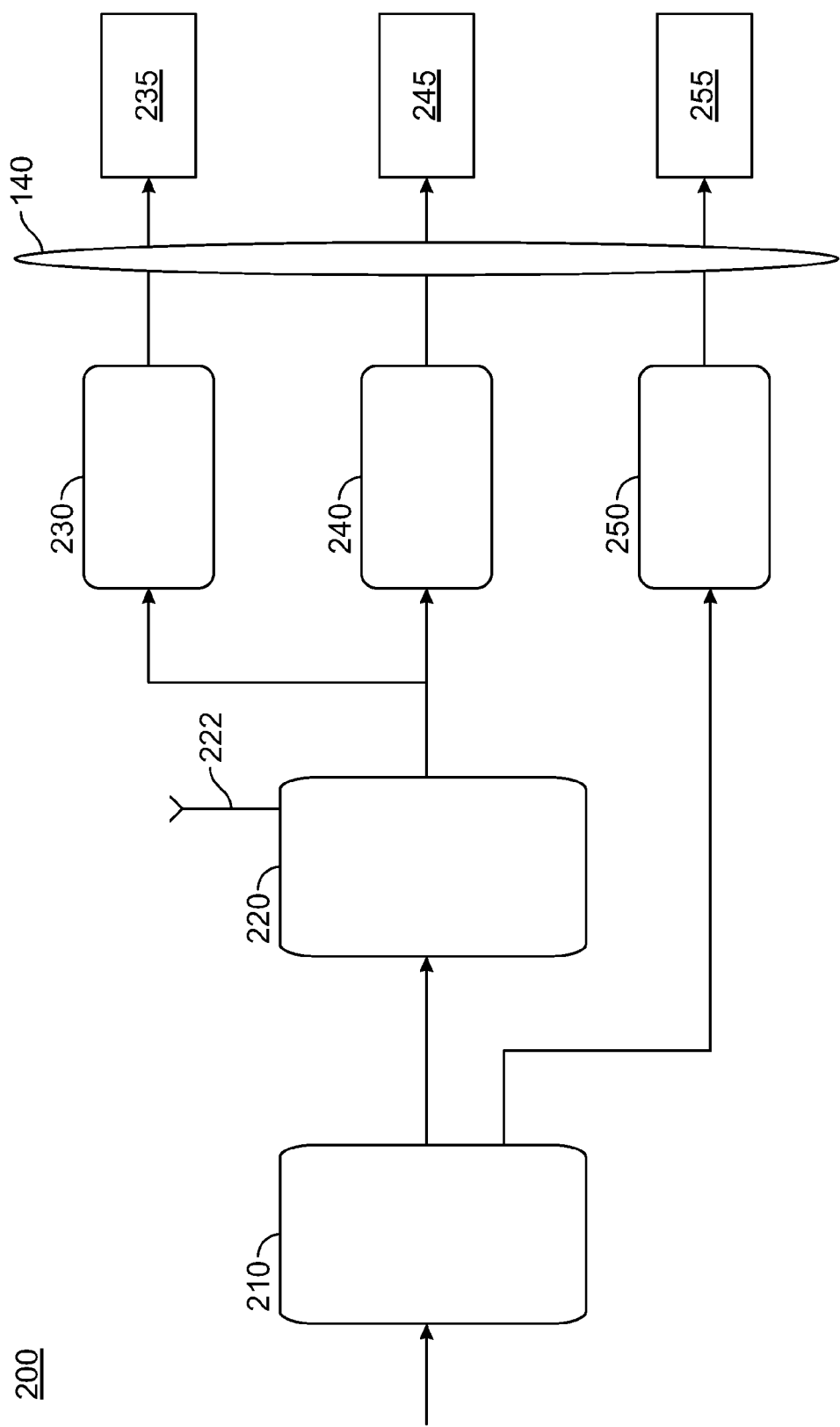
FIG. 2 schematically illustrates components in accordance with the system of FIG. 1.

FIG. 2 schematically illustrates components of UMP system 100 in accordance with an embodiment of the invention. These components may be part of processing circuitry 100, or implemented by or within control processor 118. Components 210, 220, 230, 240, 250 may therefore be implemented in hardware, software, or a combination of hardware and software. While in one embodiment a set of microphones provides input to telephony, active noise reduction or cancellation, and ASR applications, in other embodiments, a different set of applications may be used.

Pre-processing unit 210 may be configured to perform A/D conversion of the microphone signals received from microphones 130a-h. (A/D conversion may also or alternately be done by A/D unit 112 of FIG. 1) Pre-processing unit 210 may include for example gain control, decomposition into processing frames, signal transformation to the frequency domain, voice activity detection, and/or other functionality. Pre-processing may be, for example, performed by software executed by a processor (e.g., processor 118 executing software stored in RAM 116), or by a dedicated hardware unit, or by a combination of both.

Acoustic echo cancellation pre-processing unit 220 may enhance the digitized microphone signals by for example using loudspeaker feedback using a real-time loudspeaker signal, canceling out audio generated by loudspeakers within the passenger compartment. Acoustic echo cancellation pre-processing unit 220 may be provided with an output signal from pre-processing unit 210 along with input 222 from one or more loudspeakers in the passenger compartment, e.g., a loudspeaker feed, or a loudspeaker feedback signal. In one embodiment acoustic echo cancellation pre-processing unit 220 provides output to ASR pre-processing or an ASR application and telephony pre-processing or a telephony application but not to a noise canceling pre-processing or application; other arrangements may be used.

A beamforming step or process may be performed by software executed by a processor (e.g., processor 118 executing software stored in RAM 116), or by a dedicated hardware unit, or by a combination of both. A beamforming step or process may accept input and sound data received and may form certain reception beam pattern(s). In one embodiment separate reception beam patterns may be shaped or formed for each relevant purpose, e.g., telephony and ASR; in other embodiments only one beam pattern is used. In one embodiment a unified beamforming unit outputs, using the same beamforming process, to telephony (e.g., via telephony preprocessing unit 230) and ASR (e.g., via ASR pre-processing unit 240) but not active noise control. In other embodiments, beamforming may be input to different sets of applications. Unified beamforming, one beamforming process for multiple applications, may be used. In other embodiments, certain applications may include or be used with separate beamforming.

Beamforming for telephony or other units enhancement may include utilizing all of microphones 130a-h or a subset of the microphone, and may have an initial default reception pattern steered (e.g., using beamforming) to the expected position of an occupant's mouth. In accordance with an embodiment of the invention, the direction of the beam may be adaptive, such that the signal quality of the occupant's voice is optimized. Minimum variance distortionless response beamforming may be used to reduce interference as much as possible without introducing distortion in the array look direction.

Telephony pre-processing unit 230 may be configured to perform pre-processing enhancement of the digitized microphone signals for a telephony application. Telephony pre-processing unit 230 may reduce noise and residual echo in a telephone communication conducted through a telephony system built into the passenger car compartment, a connected personal telephone, and/or smartphone. Processing by telephony pre-processing unit 230 may involve for example beamforming (unified or otherwise) where the beam is steered towards a speaker's mouth; signal enhancement; signal reconstruction; and/or other functions. Signal reconstruction by telephony enhancement unit 230 may transform the speech from the frequency domain to the time domain, for example, using Fourier transform techniques.

Processing by telephony pre-processing unit 230 may include a noise reduction filter such as single channel noise reduction. Telephony pre-processing unit 230 may perform optimization using a criterion such as power spectrum or log spectral amplitude. Telephony pre-processing unit 230 may be adaptive as in for example a Generalized Sidelobe Canceller. Telephony pre-processing unit 230 may use a post filter to reduce residual echo remaining from echo cancellation.

Different processing, or different processing blocks, each for a different purpose or application, may be used. Processing blocks associated with applications other than telephony, ASR, and noise reduction or cancellation may be used.

While unified beamforming may be used, ASR pre-processing unit 240 may implement different beamforming, or beamformer and signal enhancement algorithms similar to the processing done by telephony pre-processing unit 230, but for a different purpose and metric (for example, word recognition rate or accuracy). ASR pre-processing unit 240 may use signal characteristics related to a speech recognition front-end, which may be different than the signal characteristics used for telephony enhancement. ASR pre-processing unit 240 may include a noise reduction filter such as single channel noise reduction. ASR pre-processing unit 240 may use as filter optimization criterion the signal distortion in the mel cepstrum domain. The mel cepstrum is often used in the front-end of speech recognition systems. ASR pre-processing unit 240 may optimize speech recognition metrics including word recognition rate.

Speech reconstruction artifacts such as musical noise, residual echoes, and full duplex performance are less significant for speech recognition. ASR enhancement unit 240 may maximize word recognition accuracy.

Noise cancellation pre-processing unit 250 may be configured to perform pre-processing to obtain an accurate measurement of sound pressure, noise or residual noise and provide a signal to an active noise cancellation system to enhance its performance. An external or integrated active noise cancellation system may use this signal. Noise cancellation may be performed in, for example, the range of 20-250 Hz, or other ranges. Active noise cancellation enhancement may involve measuring, near the ear, typically low frequency noise created by, for example, the car engine, or other noise. Noise measurement may be performed by a set of microphones from microphones 130a-h. Cancellation may be performed by generating 'inverted noise' via loudspeakers. Sound pressure may be measured near the head (e.g., the ear) of the occupant (e.g., driver and passenger(s)) to obtain good cancellation. Measurements for various positions, each position corresponding to a driver or passengers, may be obtained approximately, for example using a camera. Other location methods may be used, e.g., beamforming. A different beam may be formed for each passenger and for the driver.

Figure 3B:
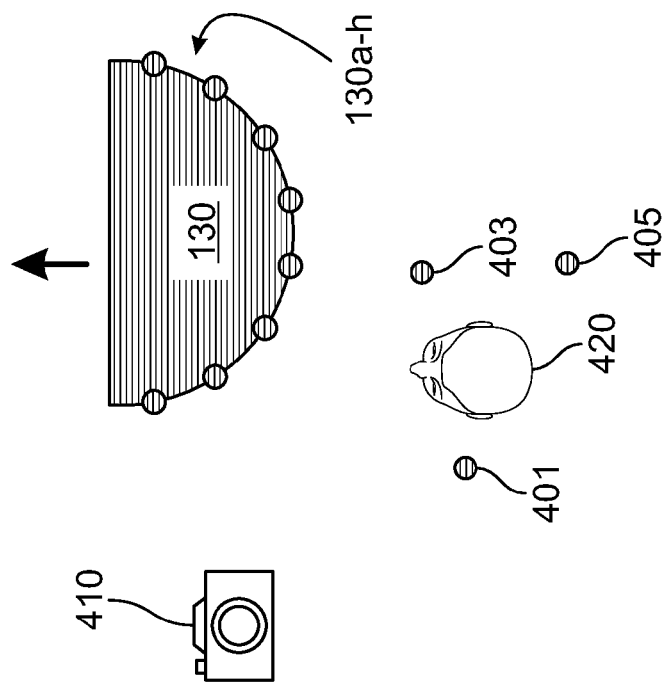
FIGS. 3A and 3B depict a noise measurement method and system for an active noise cancellation method and system according to one embodiment of the invention.
Figure 3A:
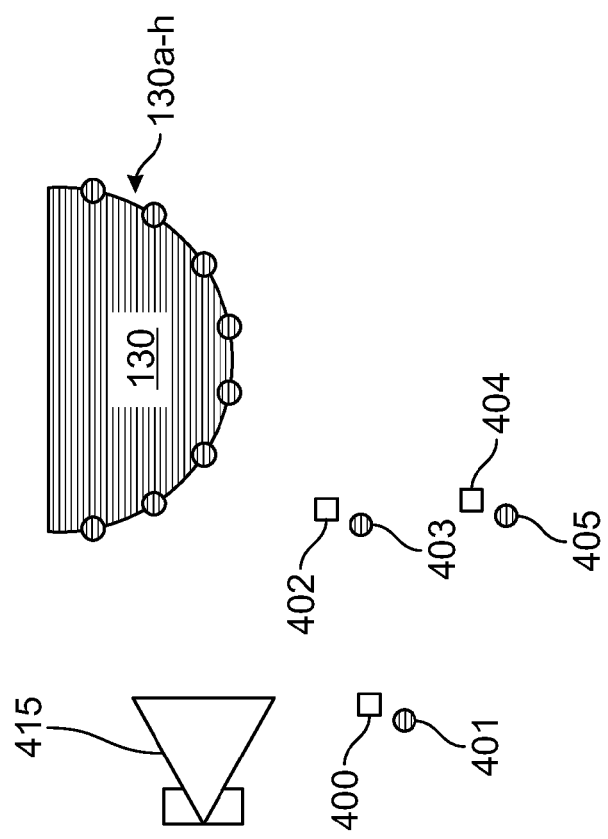

FIGS. 3A and 3B depict a noise measurement method and system for an active noise cancellation method and system according to one embodiment of the invention. Noise cancellation pre-processing unit 250 (FIG. 2) or noise cancellation system 255 (FIG. 2) may be calibrated at the factory or otherwise before use. At the factory, reference microphones 400, 402, and 404 (other numbers of microphones may be used, and typically more than three are used) may be placed in specific locations, such as on a grid or virtual grid. The vehicle may also include array 130 of microphones 130a-h. The vehicle may be a test vehicle used to calibrate a system such as a noise cancellation pre-processing unit for numerous other vehicles, or the vehicle may be an individual vehicle to be individually calibrated. Typically, microphones 400, 402, and 404 are placed according to a grid (corresponding to or located at points 401, 403, 405) near where users' heads are expected to be located, emulating alternative user positions. (Numbers of grid points and microphones other than three may be used.) Real noise (e.g., engine noise) may be provided from one or more sources 415 at frequency ranges such as 20-250 Hz, or other ranges. Noise reduction parameters for each point 401, 403 and 405 may be calculated using input obtained by microphones 130 a-h. For each point 401, 403 and 405 and corresponding microphone 400, 402, and 404, point position, noise reduction system parameters, such as beamforming parameters, may be optimized, and stored in a table or database in or accessible to noise cancellation pre-processing unit 250. Optimization may include optimizing parameters for each point 401, 403 and 405 and microphone 400, 402, and 404 position so that the signal using the array 130 is closest to the signal of microphones 400, 402, and 404. Each entry in such a table may include parameter G corresponding to grid or array points 401, 403 and 405 (e.g., G may be a point defined by three dimensional coordinates) and for each parameter G a corresponding set of array parameters H that correspond to position G. G and H each be an index or pointer pointing to such parameters. For example, Table 1 below may be stored in database 124 and may include:

TABLE 1

| | |
|---|---|
| G1 | H1 |
| G2 | H2 |
| G3 | H3 |
| ... | ... |

FIG. 3B depicts a noise cancellation system according to an embodiment of the present invention (the system of FIG. 3B may incorporate or use methods and systems described elsewhere in this application). A vehicle may include array 130 of microphones 130a-h, camera 410, or other sensors, and noise cancellation pre-processing unit 250 (FIG. 2) which outputs to noise cancellation application 255 (FIG. 2). Noise cancellation pre-processing unit 250 (e.g., in memory 116), table or database 124 (FIG. 1), storing for example data generated and shown in Table 1, above. In operation, the actual location of a user or a user's ears may be determined. Input from camera 410, array 130, and/or other sensors may be used by a processor such as processor 118, noise cancellation pre-processing unit 250 to locate a user's head 420, possibly relative to points 401, 403 and 405. In the case that location is estimated using sound, e.g., using array 130, or if the mouth is initially located, an offset may be inserted or used to reflect distance between the mouth and ears. Array parameters, such as beamforming parameters in Table 1 and/or database 124, may interpolated, given the estimated user (or user ear) location relative to points 401, 403, and 405. For example, if the actual user is determined to be located between two points in Table 1, the parameters associated with those two points may be used to find or calculate parameters that are correspondingly and proportionally between the associated parameters. The adjusted or derived array parameters may be used by noise cancellation pre-processing unit 250.

While, in some embodiments, different or partially different pre-processing, or different sets or pre-processing applications, may be performed for each application, the source data or source audio is typically from the same plurality of microphones or the same set of microphones. Thus, for each application, the same set of microphones may provide input.

Each of units 230, 240 and 250 may output or provide enhanced or processed signals to an associated application. Telephony pre-processing unit 230 may output to telephony application 235. ASR pre-processing unit 240 may output to ASR application 245. Noise cancellation pre-processing unit 250 may output to noise cancellation application 255. While certain functions such as beamforming and pre-processing are shown being performed by certain units, in other embodiments other arrangements may be used. For example, applications 235, 245 and 255 may perform functions such as pre-processing, noise cancellation, and beamforming. Applications 235, 245 and 255 may include a memory unit 114, random access memory unit 116, and control or central processor unit 118.

Figure 4:
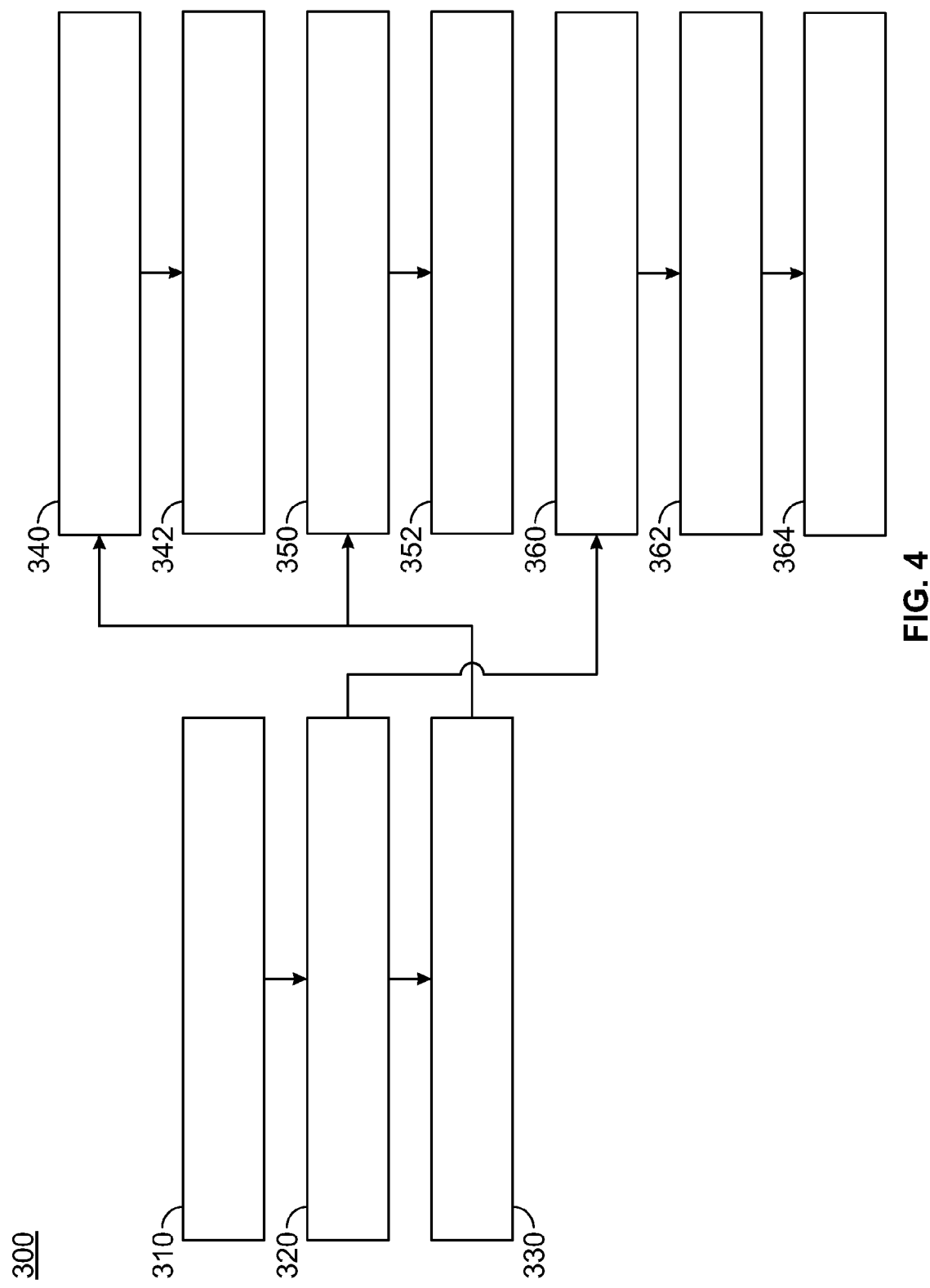
FIG. 4 illustrates a process in accordance with an embodiment of the invention.

FIG. 4 illustrates process 300 for performing unified or semi-unified microphone pre-processing in accordance with an embodiment of the invention. Process 300 may start by receiving signals, operation 310, from a plurality of microphones. While a system performing the method of FIG. 4 may be the systems shown in FIGS. 1-3, other systems may be used.

The received signals from the microphones may be pre-processed, operation 320, for example by pre-processing unit 210. This preprocessing may include A/D conversion. In one embodiment, signals from each microphone are used for a number of different functions (e.g., noise cancellation, telephony, etc.). In other embodiments, for each different function or some different functions, a different, but typically overlapping (e.g., semi-overlapping) set of microphone inputs may be used.

Acoustic echo cancellation may be performed, operation 330, for example by acoustic echo cancellation pre-processing unit 220 using a loudspeaker feed.

Enhancements such as telephony enhancement, ASR enhancement, and noise cancellation enhancement pre-processing may be performed in parallel, as indicated in FIG. 3. Beamforming may be part of each of these enhancement techniques and may differ for each.

Enhancement for telephony processing to reduce noise and residual echo reduction may include beamforming by steering the reception beam, operation 340, from an initial default reception pattern or position to a speaker's mouth, and applying signal enhancement and post-filtering operations (e.g., signal reconstruction techniques, single channel enhancement, or other operations), operation 342. The direction of the beam may be adaptive, such that the driver's signal quality is optimized.

Speech recognition enhancement may be performed by steering a beam, operation 350. For example, a beam may be steered from an initial default pattern or position to the driver's (or passenger's) mouth. Other beam steering methods may be used. Enhancement for speech recognition may be performed, operation 352. For example, a noise reduction filter such as single channel noise reduction may be used, and filter optimization criterion may be used such as the signal distortion in the mel cepstrum domain.

In operation 360, a target occupant may be located. The location may be refined or adjusted to be closer to the person's ears. In operation 362, parameters for a set of microphones may be calculated based on the location or refined location. In operation 364, the parameters may be used for active noise cancellation pre-processing. For example, microphone array parameters may be retrieved from a table or database for grid locations near the target occupants' ear(s) and interpolated, given the location. An external or integrated application may generate an inverted noise signal obtained by measuring sound pressure near the location of a driver and zero or more passengers.

In accordance with an embodiment of the invention, microphones 130a-h may be distributed in the passenger compartment rather then placed into or on a single unit, or arranged in a different geometry than a semisphere. Other processing steps, and processing in a different order, may be used. For example, gain control may be performed on the output of the enhancement modules. Frequency equalization, signal filtering, compression before sending signals to the data bus, echo residual suppression, and howl reduction may be used. In accordance with an embodiment of the invention, other forms of spatial filtering may be done instead of beamforming.

In accordance with an embodiment of the invention, processing may take a different order, for example, echo cancellation may be performed after beamforming. Beamforming may be unified for some purposes, for example, ASR and telephony. Processing may include gain control on the output of the enhancement module(s), frequency equalization, signal filtering, compression before sending signals to the data bus, etc.

In accordance with an embodiment of the invention, a unified microphone processing system and method to enhance telephony, speech recognition, and active noise control may include multiple microphones, processing circuitry, and software. The system may use all microphones simultaneously to obtain enhanced performance of telephony, speech recognition, and active noise control. Incorporating the system in a vehicle may reduce costs associated with wiring and processing.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for using a single set of microphones for telephony, speech recognition, and active noise control in accordance with an embodiment of the invention.

The computer-readable medium may be a non-transitory computer-readable media including all forms and types of memory and all computer-readable media except for a transitory, propagating signal. In one implementation, external flash memory accessible by control processor 118 may be the non-volatile memory or computer-readable medium.

While there have been shown and described fundamental novel features of the invention as applied to one or more embodiments, it will be understood that various omissions, substitutions, and changes in the form, detail, and operation of these embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A processor implemented method for using a single set of spatially disparate microphones for plurality of audio applications, the method comprising:
   receiving signals from the microphones;
   processing the received signals to produce one or more processed-signals;
   providing the processed-signals to the plurality of audio applications, the plurality of audio applications comprising at least: an active noise cancellation application, and one of: a telephony application and an automatic speech recognition application; and
   outputting inverted noise signals via one or more speakers, wherein the inverted noise signals are generated by the active noise cancellation application;
   further wherein the processing comprises:
      performing enhancement to the received signals, the enhancement configured for acoustic echo cancellation;
      performing noise reduction and residual echo reduction, both by:
         steering at least one of multiple reception beams to a speaker's mouth,
         using signal enhancement technique, and
         using signal reconstruction technique;
      performing a speech recognition enhancement pre-processing on the received signals, wherein the speech recognition enhancement pre-processing is configured to optimize a metric of at least one of: Mel cepstrum distance or word recognition rate; and
      performing sound pressure measurements near a head of one or more occupants.

2. The method of claim 1, wherein the processing further comprises at least one of:
   adaptively beamforming two or more reception beams of the microphones, responsive to changes in acoustic conditions; and
   directing at least one of the adaptively beamformed reception beams to at least one of the occupants.

3. A unified microphone pre-processing system comprising:
   a plurality of microphones arranged within a vehicle passenger-compartment;
   one or more loudspeakers arranged within the vehicle passenger-compartment;
   a memory unit comprising:
      an active noise cancellation processing application (ANCPA) configured to output inverted noise signals via at least one of the loudspeakers, and
      at least one of: telephony processing application and automatic speech recognition processing application; and
   a processor configured for:
      receiving signals from the plurality of microphones,
      performing enhancement to the received signals, the enhancement configured for acoustic echo cancellation,
      performing noise reduction and residual echo reduction, both by:
         steering at least one of multiple reception beams to a speaker's mouth,
         using signal enhancement technique, and
         using signal reconstruction technique,
      performing a speech recognition enhancement pre-processing on the received signals, wherein the speech recognition enhancement pre-processing is configured to optimize a metric of at least one of: Mel cepstrum distance or word recognition rate, and
      performing sound pressure measurements near a head of one or more occupants;
      generating one or more enhanced-signals; and
      outputting the inverted noise signals via the one or more speakers;
   wherein:
      at least one of the enhanced-signals is configured to serve as input to the ANCPA, and
      at least one of the enhanced-signals is configured to serve as input to at least one of: the telephony processing application and the automatic speech recognition processing application.

4. The system of claim 3, wherein the processing-system comprises a pre-processing unit comprising:
   an analog-to-digital converter configured to convert the received-signals to digital-signals;
   a memory unit configured for storing; and
   a control processor configured to perform pre-processing enhancement techniques on the digital-signals.

5. The system of claim 3, wherein the processing-system comprises a beamformer unit configured for adaptive construction of two or more reception beams of the plurality of microphones, responsive to changes in acoustic conditions of the vehicle passenger: compartment.

6. The system of claim 4, wherein the processing-system further comprising at least one of:
   an acoustic echo cancellation pre-processing unit, configured to reduce acoustic echo; and
   a speech recognition pre-processing unit configured to enhance the digital-signals and to optimize a metric of at least one of: Mel cepstrum distance and word recognition rate.

7. The system of claim 3, wherein the plurality of microphones are arranged in a predetermined geometrical pattern.

8. The system of claim 7, wherein the geometrical pattern is semispherical.

9. The system of claim 3, wherein the processing-system further comprises a noise cancellation pre-processing unit configured for:
   locating a target occupant;
   retrieving microphone array parameters for locations near the target occupant; and interpolating the array parameters in order to generate the at least one of the enhanced-signals configured to serve as input to the ANCPA.

10. The system of claim 9, further comprising a camera configured for the locating of the target occupant.

11. The system of claim 9, wherein at least one of the microphones is an omni-directional microphone.

12. A processor implemented method for unified microphone pre-processing, the method comprising:
receiving signals from a plurality of microphones, wherein the microphones are arranged within a vehicle passenger-compartment;
pre-processing the received signals, wherein the pre-processing comprises:
performing enhancement to the received signals, the enhancement configured for acoustic echo cancellation,
performing noise reduction and residual echo reduction, both by:
steering at least one of multiple reception beams to a speaker's mouth,
using signal enhancement technique, and
using signal reconstruction technique,
performing a speech recognition enhancement pre-processing on the received signals, wherein the speech recognition enhancement pre-processing is configured to optimize a metric of at least one of: Mel cepstrum distance or word recognition rate, and
performing sound pressure measurements near a head of one or more occupants;
generating one or more enhanced-signals, wherein:
at least one of the enhanced-signals is configured for serving as input to an active noise cancellation processing application (ANCPA) stored in a memory, and
at least one of the enhanced-signals is configured for serving as input to at least one of: telephony processing application stored in a memory and automatic speech recognition processing application stored in a memory; and
outputting inverted noise signals via one or more loudspeakers arranged within the vehicle passenger-compartment, wherein the inverted noise signals are generated by the ANCPA.

13. The method of claim 12, further comprising converting the received-signals from analog-signals to digital-signals, and wherein the pre-processing further comprises performing enhancement techniques on the digital-signals.

14. The method of claim 12, further comprising at least one of:
adaptively beamforming two or more reception beams of the microphones, responsive to changes in acoustic condition of the vehicle passenger-compartment; and
steering at least one of the adaptively beamformed reception beams of the microphones to a driver and one or more passengers in a vehicle passenger-compartment.

15. The method of claim 12, wherein the plurality of microphones are arranged in a predetermined geometrical pattern.

16. The method of claim 12, further comprising:
locating a target occupant;
retrieving microphone array parameters for locations near the target occupant; and
interpolating the array parameters in order to generate the at least one of the enhanced-signals configured for serving as input to the ANCPA.

17. The method of claim 12, wherein at least one of the microphones is an omni-directional microphone.

* * * * *